(12) United States Patent
Shin et al.

(10) Patent No.: US 10,347,918 B2
(45) Date of Patent: Jul. 9, 2019

(54) SURFACE-TREATED CATHODE ACTIVE MATERIAL AND LITHIUM SECONDARY BATTERY USING THE SAME

(71) Applicants: HYUNDAI MOTOR COMPANY, Seoul (KR); Industry-University Cooperation Foundation Hanyang University, Seoul (KR)

(72) Inventors: Kyo Min Shin, Hwaseong-Si (KR); Sa Heum Kim, Gwacheon-Si (KR); Dong Gun Kim, Gunpo-Si (KR); Yun Chae Jung, Seoul (KR); Dong Won Kim, Seoul (KR); Ik Su Kang, Seoul (KR); Yoon Sung Lee, Seoul (KR)

(73) Assignees: HYUNDAI MOTOR COMPANY, Seoul (KR); IUCF-HYU (INDUSTRY-UNIVERSITY COOPERATION FOUNDATION HANYANG UNIV.), Seoul (KR)

( * ) Notice: Subject to any disclaimer, the term of this patent is extended or adjusted under 35 U.S.C. 154(b) by 688 days.

(21) Appl. No.: 14/536,207

(22) Filed: Nov. 7, 2014

(65) Prior Publication Data

US 2015/0188144 A1 Jul. 2, 2015

(51) Int. Cl.
*H01M 4/62* (2006.01)
*H01M 4/04* (2006.01)
(Continued)

(52) U.S. Cl.
CPC ......... *H01M 4/628* (2013.01); *H01M 4/0402* (2013.01); *H01M 4/131* (2013.01);
(Continued)

(58) Field of Classification Search
CPC ........ H01M 4/049; H01M 4/366; H01M 4/36; H01M 4/667; H01M 4/628; H01M 4/0402; H01M 4/131; H01M 4/1391; H01M 4/62
(Continued)

(56) References Cited

U.S. PATENT DOCUMENTS

| | | | | |
|---|---|---|---|---|
| 2004/0018430 A1* | 1/2004 | Holman | ................... | H01M 4/13 429/233 |
| 2004/0091776 A1* | 5/2004 | Hwang | ............... | H01M 2/1673 429/218.1 |

(Continued)

FOREIGN PATENT DOCUMENTS

| | | |
|---|---|---|
| JP | 3030053 B2 | 1/1992 |
| JP | 2010-102895 A | 5/2010 |

(Continued)

OTHER PUBLICATIONS

Yang "Improving the Performance of Lithium-Sulfur Batteries by Conductive Polymer Coating", ACS Nano, 2011, 5 (11), pp. 9187-9193.*

(Continued)

*Primary Examiner* — Cynthia H Kelly
*Assistant Examiner* — Rashid A Alam
(74) *Attorney, Agent, or Firm* — Morgan Lewis & Bockius LLP

(57) ABSTRACT

A surface-treated cathode active material useful for manufacturing a lithium secondary battery have excellent output characteristics by performing a double coating with metal oxide and an electron and ion conductive polymerized copolymer on a surface of a cathode active material for a lithium secondary battery to enhance electrochemical properties and thermal stability of the cathode active material.

11 Claims, 17 Drawing Sheets

(51) Int. Cl.
  *H01M 4/131* (2010.01)
  *H01M 4/1391* (2010.01)
  *H01M 4/36* (2006.01)
  *H01M 4/505* (2010.01)
  *H01M 4/525* (2010.01)
  *H01M 10/052* (2010.01)
  *H01M 4/02* (2006.01)

(52) U.S. Cl.
  CPC ......... *H01M 4/1391* (2013.01); *H01M 4/366* (2013.01); *H01M 4/62* (2013.01); *H01M 4/505* (2013.01); *H01M 4/525* (2013.01); *H01M 10/052* (2013.01); *H01M 2004/028* (2013.01); *H01M 2220/20* (2013.01); *H01M 2220/30* (2013.01); *Y02E 60/122* (2013.01)

(58) Field of Classification Search
  USPC ....................................................... 429/212
  See application file for complete search history.

(56) References Cited

U.S. PATENT DOCUMENTS

| | | | | |
|---|---|---|---|---|
| 2011/0129731 A1* | 6/2011 | Wakizaka | ........... | H01M 4/0435 429/217 |
| 2013/0224594 A1* | 8/2013 | Yushin | .................... | H01M 4/38 429/218.1 |
| 2015/0325857 A1* | 11/2015 | Take | .................... | H01M 4/137 429/199 |

FOREIGN PATENT DOCUMENTS

| | | | |
|---|---|---|---|
| KR | 10-2002-0018395 A | 3/2002 | |
| KR | 10-2007-0008115 A | 1/2007 | |
| KR | 10-2007-0016431 A | 2/2007 | |
| KR | 10-2007-0096179 A | 10/2007 | |
| KR | 10-2009-0126356 A | 12/2009 | |
| KR | 10-2011-0023067 A | 3/2011 | |
| KR | 10-2011-0056151 A | 5/2011 | |
| KR | 10-2013-0087472 A | 8/2013 | |
| WO | 2003/094262 A1 | 11/2003 | |
| WO | WO 2012146961 A1 * | 11/2012 | ........... C01G 23/005 |

OTHER PUBLICATIONS

Wu "Polyethylene-Glycol-Doped Polypyrrole Increases the Rate Performance of the Cathode in Lithium-Sulfur Batteries", ChemSUSChem, vol. 6, Issue 8, Aug. 2013, pp. 1438-1444.*

A. Fedorkova, et al., "Improved lithium exchange at LiFePO4 cathode particles by coating with composite polypyrrole-polyethylene glycol layers," J. Solid State Electrochem (2009), vol. 13, pp. 1867-1872.

Yang, et al., "Improving the performance of lithium_sulfur batteries by conductive polymer coating," ACS Nano, vol. 5, Issue No. 11, pp. 9187-9193.

* cited by examiner

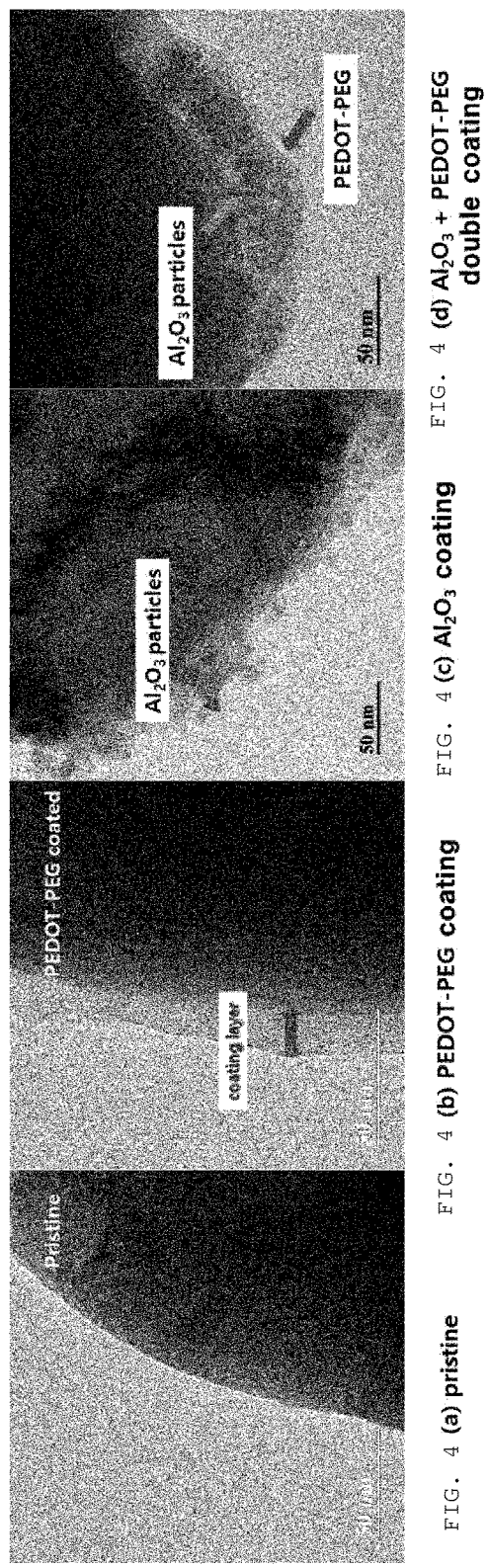
FIG. 4 (a) pristine   FIG. 4 (b) PEDOT-PEG coating   FIG. 4 (c) $Al_2O_3$ coating   FIG. 4 (d) $Al_2O_3$ + PEDOT-PEG double coating — # SURFACE-TREATED CATHODE ACTIVE MATERIAL AND LITHIUM SECONDARY BATTERY USING THE SAME

CROSS-REFERENCE TO RELATED APPLICATION

This application claims under 35 U.S.C. § 119(a) the benefit of priority to Korean Patent Application No. 10-2013-0167772 filed on Dec. 30, 2013, the entire contents of which are incorporated herein by reference.

BACKGROUND (a) Technical Field

The present disclosure relates to a surface-treated cathode active material and a lithium secondary battery using the same. More particularly, the present disclosure relates to a surface-treated cathode active material useful for manufacturing a lithium secondary battery having excellent output characteristics by performing a double coating by primarily coating metal oxide on a surface of a cathode active material for the lithium secondary battery and secondarily coating a conductive polymerized copolymer having both ion conductivity and electron conductivity thereon to enhance electrochemical properties and thermal stability of the cathode active material, and the lithium secondary battery using the same.

(b) Background Art

A lithium secondary battery is manufactured by using a material capable of intercalating and deintercalating lithium ions as a negative electrode and a positive electrode and intercalating an organic electrolytic solution or a polymer electrolyte which enables lithium ions to move between the negative electrode and the positive electrode, and stores electrical energy by means of redox reactions according to the intercalation and deintercalation of lithium ions in the positive electrode and the negative electrode.

In order to enhance electrochemical properties and safety of the lithium secondary battery as described above, studies on surface treatments of the cathode active material of the lithium secondary battery have been actively performed.

In a case of the cathode active material for the lithium secondary battery, dissolution of Li by HF produced in the electrolytic solution may be prevented by using metal oxide ($Al_2O_3$, $ZrO_2$ and $La_2O_3$), metal phosphorus oxide ($AlPO_4$ and $LiCoPO_4$), carbon, halogen gas, metal hydroxide, a conductive polymer and the like to reduce a direct reaction with an electrolyte through a positive electrode surface coating of several nm, and the stability of a crystal structure may be secured by suppressing elution of various transition metals.

However, there is a limitation in that a drawback occurs, when the movement of lithium ions and electronic conduction are interrupted in the case where a coating material, such as metal oxide which is a non-conductor, is used so that the mobility of lithium ions and electrons deteriorates. Further, when coating with an inorganic particle alone, it is difficult to secure uniformity of the coating. In particular, it is insufficient to secure the structural stability of the cathode active material due to non-uniformity of the coating while a side reaction with the electrolytic solution occurs.

In a case of a polymer coating, it is possible to perform coating with an organic material as the related art in terms of securing the uniformity of the coating, however due to thermal instability of the organic material and a too large thickness of the coating layer, ions may not be smoothly transfer, so that performance deteriorates.

Accordingly, depending on the particular inorganic material or polymer, the cathode active material has a limitation which may not be overcome in improving physical properties by only the surface modification.

For this reason, as a cathode active material surface modification technology for improving high capacity, high output, and service life characteristics of the lithium secondary battery, a technology of coating manganese oxide with a conductive polymer or obtaining a coating by mixing two materials have been studied, however there is only an intention to obtain improvement in performance by simply increasing the content of a conductive material.

As an example of the related art, Korean Patent Application Publication No. 2007-8115 proposes a cathode active material sequentially including a first covering layer of oxide on a surface of a lithium transition metal oxide particle, and a second covering layer of a conductive material on the first covering layer as a technology having a double coating structure. However, the material used in the second covering layer is a pure electron conductive material, and thus the movement of lithium ions is not smooth during a charging and discharging process.

Korean Patent Application Publication No. 2011-23067 proposes a cathode active material for a lithium secondary battery including a lithium metal oxide secondary particle core, a first shell formed by coating the surface of a secondary particle core portion with a plurality of barium titanate particles and a plurality of metal oxide particles, and a second shell formed by coating a surface of the first shell with a plurality of olivine-type lithium iron phosphate oxide particles and a plurality of conductive material particles. Furthermore, Korean Patent Application Publication No. 2007-16431 proposes an active material for a lithium secondary battery, which has a core material and a surface treatment layer which is formed on a surface of a core material and includes an inorganic particulate having a nano-size and conductive polymer.

However, according to the technologies of the surface coating-treated cathode active material as described above, although surface modification effects are improved as compared to the existing technologies, conductivity and ion transfer effects are not fully exhibited, and effects of the improvement in performance such as electrochemical properties and thermal stability are slight.

Japanese Patent Application Publication No. 2005-524936 proposes an electrode manufactured while a conductive material and an ion conducting polymer are extruded into an active material including metal oxide through an extruder. However, effects of the improvement in performance such as electrochemical properties and thermal stability are not very good because the structure of the active material is unstable and non-uniform.

In addition to the technologies described above, there are several technologies using a conductive polymer and a metal powder, such as a technology in which a cathode active material is coated with a polymer having both ion conductivity and electric conductivity and a polymer film to which a conductive metal powder is added. However, it does not sufficiently resolve the existing problems in improving physical properties, such as maintaining a balance between conductivity and ion transfer effects.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with the related art.

As a result of intensive studies for solving the problems in the related art, it has been found that when a cathode active material for a lithium secondary battery is double-coated by primarily coating an inorganic material on a surface of the cathode active material, and secondarily coating a conductive polymerized copolymer having both electron conductivity and ion conductivity thereon, electrochemical properties and thermal stability of the cathode active material are greatly enhanced. As a result, a lithium secondary battery having excellent output characteristics may be manufactured.

An aspect of the present disclosure provides a cathode active material double-coated with metal oxide and a polymerized copolymer having electron conductivity and ion conductivity on a surface of the cathode active material.

Another aspect of the present disclosure provides a cathode active material with a surface modified such that electrochemical properties and thermal stability are greatly enhanced.

Still another aspect of the present disclosure provides a lithium secondary battery having a long service life and excellent output characteristics by using a cathode active material with electrochemical properties and thermal stability that are greatly enhanced due to a surface modification.

According to an exemplary embodiment of the present disclosure, a surface-treated cathode active material is double-coated by primarily coating metal oxide on a surface of a cathode active material, and secondarily coating a polymerized copolymer having both electron conductivity and ion conductivity thereby forming a double coating on the surface of the cathode active material.

In another aspect of the present disclosure, a lithium secondary battery comprising the surface-treated cathode active material is provided.

The surface-treated cathode active material according to the present disclosure is a cathode active material in which electrochemical properties of a positive electrode material for a lithium secondary battery are greatly enhanced by a double coating treatment with metal oxide and an electron and ion-conductive copolymerized polymer.

In particular, it is possible to enhance high voltage and service life characteristics as well as structural and thermal stability through surface modification of the cathode active material by secondarily and uniformly coating a polymer having both electron conductivity and ion conductivity on a primarily coated inorganic material as compared to electrode materials coated with only the inorganic material.

It is also possible to manufacture a lithium secondary battery having better output characteristics than existing electrodes coated with an inorganic material by using a polymer material having electron conductivity and ion conductivity to enhance the movement of lithium ions and electron conductivity of the electrode.

Other aspects and embodiments of the invention are discussed infra.

It is understood that the term "vehicle" or "vehicular" or other similar term as used herein is inclusive of motor vehicles in general; such as passenger automobiles, including sports utility vehicles (SUV); buses; trucks; various commercial vehicles; watercraft, including a variety of boats and ships; aircraft; and the like; and includes hybrid vehicles; electric vehicles; plug-in hybrid electric vehicles; hydrogen-powered vehicles; and other alternative fuel vehicles (e.g., fuels derived from resources other than petroleum). As referred to herein, a hybrid vehicle is a vehicle that has two or more sources of power, for example, both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

FIGS. 4(a)-4(d) are transmission electron microscope (TEM) comparison photographs of $LiNi_{0.6}Co_{0.2}Mn_{0.2}O_2$ before and after being coated with each component according to the present disclosure.

In FIG. 5A, the charging voltage is 4.3 V and in FIG. 5B, the charging voltage is 4.6 V.

In FIG. 7A, the charging voltage is 4.3 V and in FIG. 7B, charging voltage is 4.6 V.

In FIG. 11A, the charging voltage is 4.3 V and in FIG. 11B, the charging voltage is 4.6 V.

Figure 1:
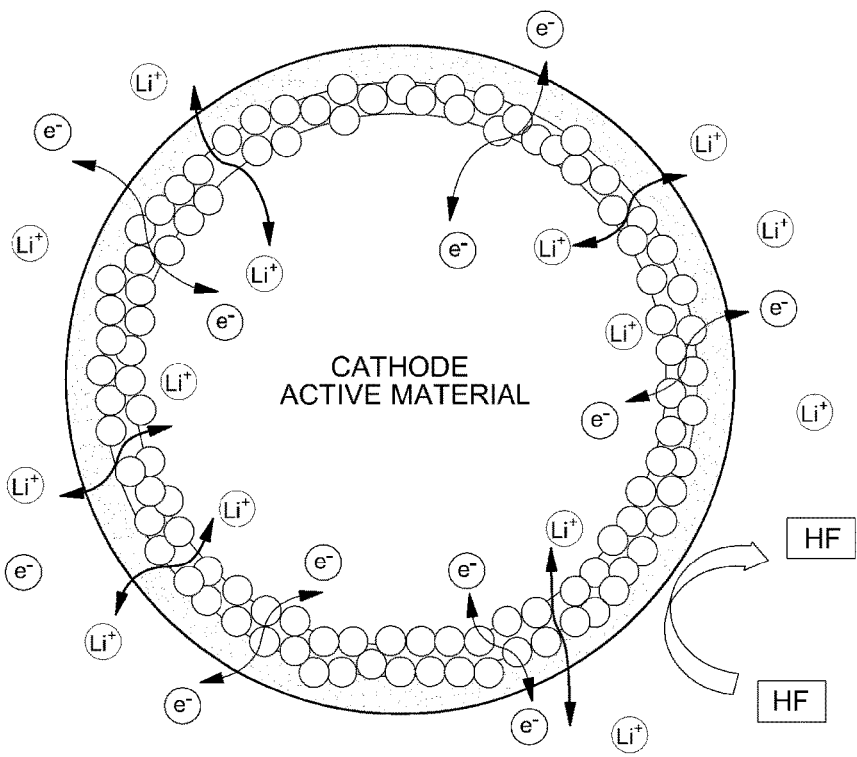
FIG. 1 is a schematic view illustrating a structure in which a surface-treated cathode active material according to the present disclosure is double-coated.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawings.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Hereinafter, an exemplary embodiment of the present disclosure will be described in more detail as follows.

The present disclosure relates to a surface-treated cathode active material in which metal oxide and a polymerized copolymer having both electron conductivity and ion conductivity are successively double-coated on a surface of the cathode active material.

According to the present disclosure, as the cathode active material, those selected from lithium transition metal oxides and sulfur compounds may be used. Specific examples of the cathode active material which may be used in the present disclosure include $LiCoO_2$, $LiNi_xCo_yMn_zO_2$ ($0 \leq x \leq 1$, $0 \leq y \leq 1$, $0 \leq 1 \leq z$), $LiNi_{0.5}Mn_{1.5}O_4$, $LiMn_2O_4$, $LiFePO_4$, sulfur, and the like.

As an example of the metal oxide which is primarily coated on the surface of the cathode active material in the present disclosure, it is possible to use one or more selected from the group consisting of $Al_2O_3$, $SiO_2$, $TiO_2$, $SnO_2$, $CeO_2$, $ZrO_2$, $BaTiO_3$, and $Y_2O_3$. As the metal oxide, those having an average particle diameter of 1 nm to 100 nm may be used.

According to the present disclosure, the metal oxide may be coated in an amount up to 0.1 to 2.0 wt % based on the weight of the cathode active.

According to the present disclosure, the metal oxide is primarily coated in a small thickness on the surface of the cathode active material, and then a polymerized copolymer having both electron conductivity and ion conductivity is coated as a secondary coating thereon.

As an example of the electron conductive polymer used herein, it is possible to use one or more selected from the group consisting of polythiophene, polyethylene dioxythiophene, polyaniline, polypyrrole, and polyacetylene.

As an example of the ion conductive polymer, it is possible to use one or more selected from the group consisting of polyethylene glycol, polypropylene glycol, polyalkylene carbonate, and polyester.

According to the present disclosure, as the polymerized copolymer having both electron conductivity and ion conductivity, the copolymer of the aforementioned electron conductive polymer, and the aforementioned ion conductive polymer may be used. As the polymerized copolymer, poly (3,4-ethylenedioxythiophene)-block-poly (ethylene glycol) (PEDOT-PEG) may be used.

According to the present disclosure, the cathode active material successively double-coated with the metal oxide and the polymerized copolymer as described above may have a total coating thickness of 5 to 500 nm. In certain embodiments, the total coating thickness may be 10 to 100 nm. When the coating layer is too thin, it is difficult to expect enhancement in performance, and when the coating layer is too thick, resistance encountered in transfer of ions and electrons is increased, so that it is difficult to obtain a high capacity.

FIG. 1 is a schematic view illustrating a structure in which a surface-treated cathode active material according to the present disclosure is double-coated.

According to the present disclosure, drawbacks of each of the inorganic material and the polymer may be compensated for by a double coating method using both inorganic material and polymer instead of using the inorganic material or the polymer alone.

First, a metal oxide, which is the inorganic material applied as a primary coating of the cathode active material, is primarily coated on the surface of the cathode active material in order to secure thermal stability of the metal oxide and improve service life characteristics. A polymerized copolymer having both electron conductivity and ion conductivity is subsequently secondarily coated in order to overcome non-uniformity of the primarily coated inorganic material and simultaneously enhance electron conductivity and ion conductivity of the cathode active material. In particular, the polymerized copolymer having both electron conductivity and ion conductivity significantly improves the reduction in electron and ion conductivities caused by the coating with the primary metal oxide, which is a non-conductor. When the polymerized copolymer having electron conductivity and ion conductivity is coated on the cathode active material, smoother ion transfer and electron conduction are exhibited in intercalation and deintercalation reactions of lithium than that provided by other polymers, and thus, capacity and output characteristics are greatly enhanced.

When the cathode active material according to the present disclosure, which is surface-treated with the polymerized copolymer having electron conductivity and ion conductivity used in the present disclosure, such as a PEDOT-PEG polymer, is used in a lithium secondary battery, a coating layer may be stably maintained during charging and discharging cycles because the coating layer does not dissolve in ethylene carbonate (EC), propylene carbonate (PC), dimethyl carbonate (DMC), diethyl carbonate (DEC), and the like, which are used in an electrolytic solution for the lithium secondary battery. Accordingly, structural stability of the cathode active material may be maintained, and a side reaction with the electrolytic solution may be reduced. In particular, the effects of the coating at high voltage and high temperature, at which decomposition of the electrolytic solution occurs, are maximized. Furthermore, since the polymer is used as a final coating layer, the present disclosure has an additional effect in that adhesion strength with a polymer material used as a binder for the lithium secondary battery is increased. The effect according to the present disclosure is demonstrated in the following Examples.

As described above, the present disclosure may enhance electrochemical characteristics and thermal stability of the cathode active material for a lithium secondary battery by double coating the metal oxide coating and the electron and ion conductive polymerized copolymer. In particular, it is possible to enhance high voltage and service life characteristics as well as structural and thermal stability by modifying the surface by primarily and thinly coating the metal oxide on the surface of the cathode active material, and secondarily and uniformly coating a polymer having both electron conductivity and ion conductivity on the primary coating layer as compared to electrode materials coated with only the inorganic material.

According to the present disclosure, it is possible to provide a lithium secondary battery having better output characteristics than a battery using an existing electrode coated with an inorganic material by using a polymer material having electron conductivity and ion conductivity to enhance the movement of lithium ions and electron conductivity of the electrode as described above.

Accordingly, the present disclosure provides a lithium secondary battery including the surface-treated cathode active material as described above.

The lithium secondary battery manufactured by using the surface-treated cathode active material according to the present disclosure has excellent output characteristics and improvement in long service life compared to existing lithium secondary batteries.

The lithium secondary battery manufactured by using the surface-treated cathode active material according to the present disclosure may be applied not only to small secondary batteries used in mobile electronic devices, such as mobile phones, laptop computers, and digital cameras, but also to medium to large energy storing devices, and the like, which are used in electric vehicles, energy storing systems, and the like. In particular, the lithium secondary battery may be applied to an electric vehicle, which consumes a relatively high amount of energy and is excessively used over a long period of time.

Hereinafter, the present disclosure will be described in detail with reference to Examples, but is not limited by the Examples.

EXAMPLES

The following examples illustrate the invention and are not intended to limit the same.

Example 1. Surface Treatment of Cathode Active Material

Figure 2:
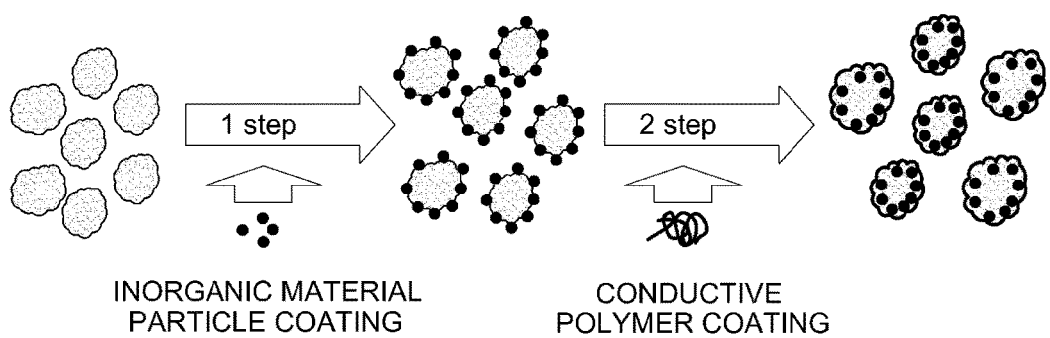
FIG. 2 is a concept view of a coating process schematically illustrating a double coating process of the surface-treated cathode active material according to the present disclosure.
Figure 3A:
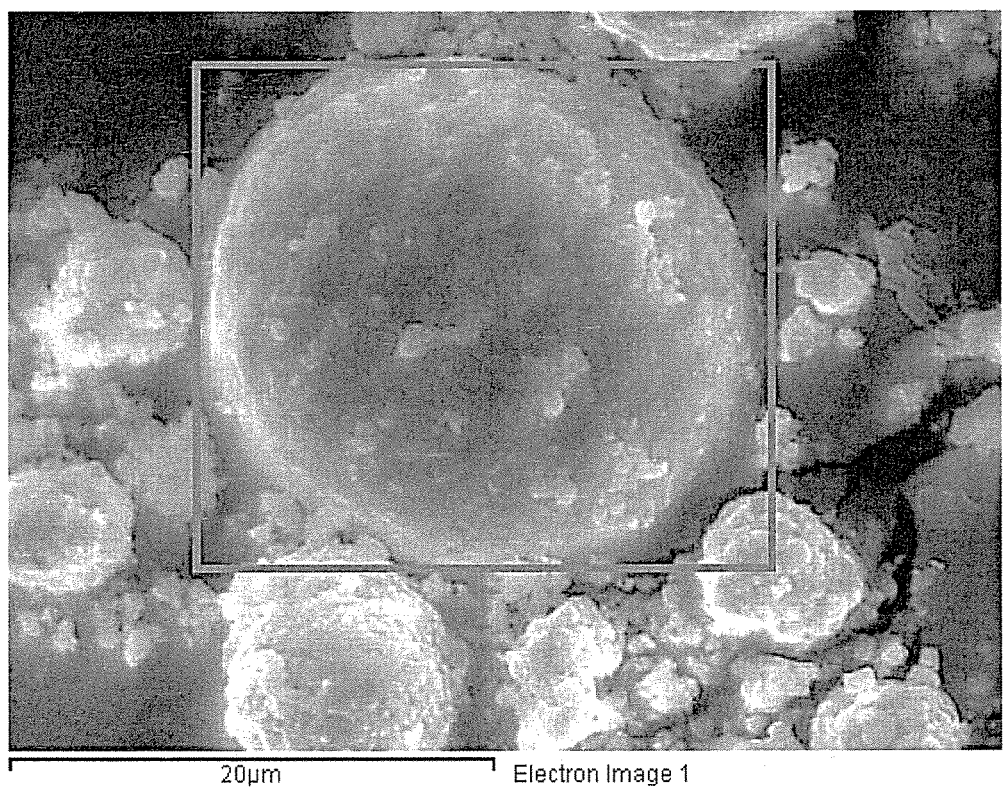
FIGS. 3(a)-3(d) are photographs comparing differently coated cathode active materials including a scanning electron microscope (SEM) photograph of $LiNi_{0.6}Co_{0.2}Mn_{0.2}O_2$ double-coated with an inorganic material and a conductive polymer, and an SEM photograph of pristine $LiNi_{0.6}Co_{0.2}Mn_{0.2}O_2$.
Figure 3B:
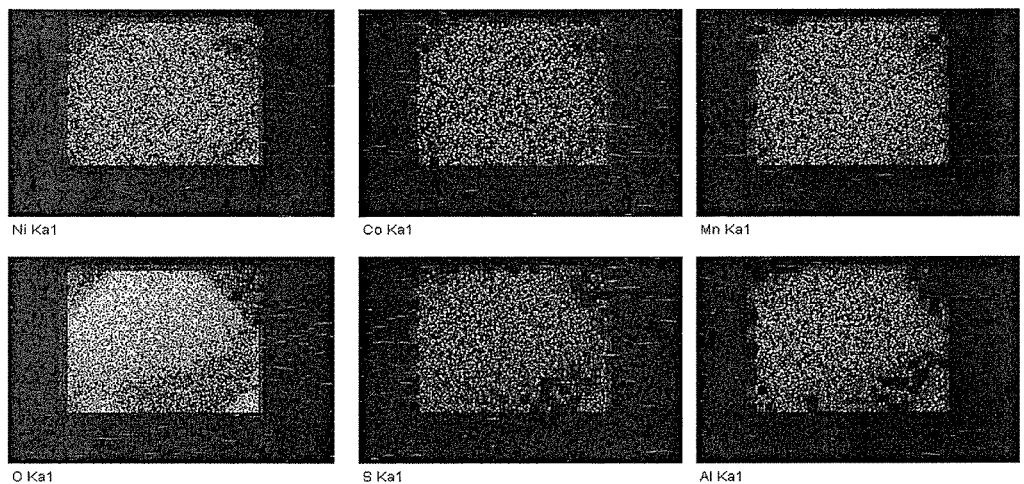
Figure 3C:
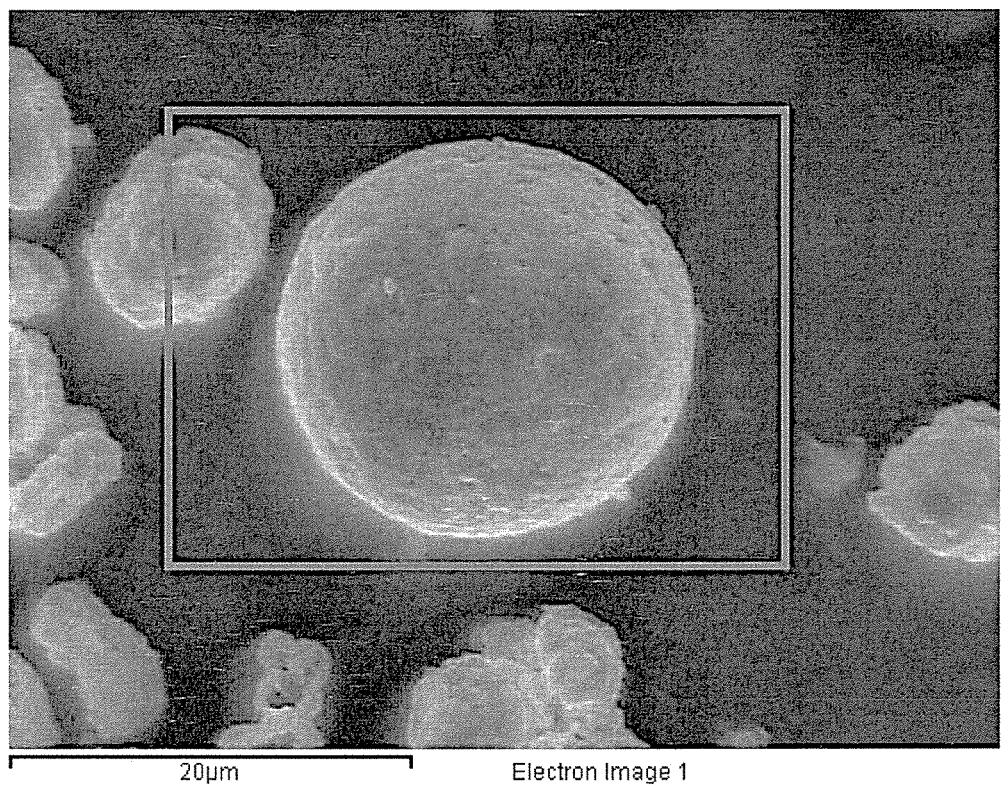
Figure 3D:
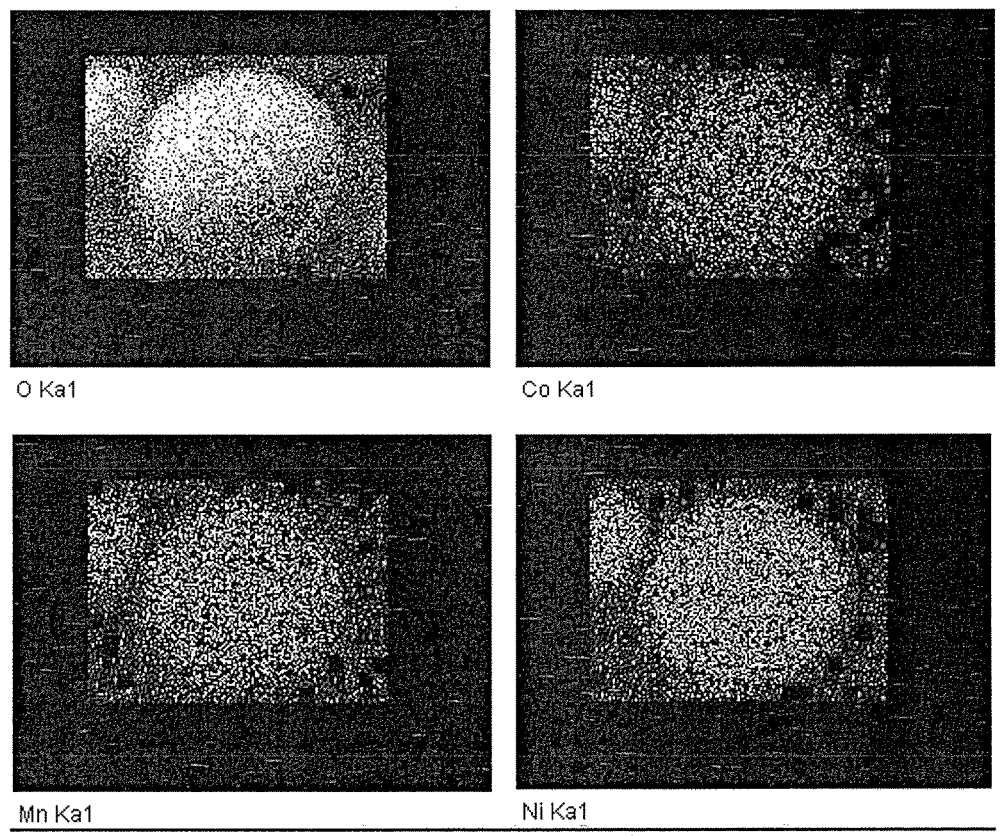

A schematic surface coating process of an active material is illustrated in FIG. 2. Coating was performed as illustrated in FIG. 2. A cathode active material may be applied to all metal oxide materials, and was applied to the Li[Ni$_{0.6}$Co$_{0.2}$Mn$_{0.2}$]O$_2$ (hereinafter, NMC 622) material in the present Example. A dry coating was performed on the NMC 622 surface using aluminum oxide (Al$_2$O$_3$, Aldrich) having a size of 2 to 9 nm, and herein, an amount of 0.5 wt % was coated. For the dry coating, a ball-milling method known in the art was used, and dry coating was performed at a speed of 300 rpm for 6 hours.

The cathode active material subjected to dry coating was introduced into a nitromethane solution in which a PEDOT-PEG polymer was dissolved, and the resulting solution was stirred at temperature of 60° C. for 6 hours. After stirring, a solid was obtained through a filtering process, and the double coating on the surface of the cathode active material was completed by vacuum-drying the solid at 110° C.

Example 2. Morphology Analysis of Cathode Active Material

Morphology of the cathode active material subjected to coating was confirmed. In order to confirm the degree of dispersion of the coating material on the surface of the electrode subjected to coating, mapping results of various elements were analyzed using a scanning electron microscope and illustrated in FIGS. 3(a)-3(d).

As a result of comparison with the cathode active material (pristine positive electrode) which was not coated, aluminum (Al) and sulfur (S) contained in the inorganic material and the conductive polymer were detected in the case of the double coated cathode active material, and it could be seen that these elements were uniformly coated on the surface of the active material. The photographs observed using TEM in FIGS. 4(a)-4(d) each shows (a) the surface of the active material before coating, (b) the surface of the active material after coating with the electron and ion conductive polymer, (c) the surface of the active material after primary coating with metal oxide, and (d) the surface of the active material subjected to double coating with the inorganic material and the electron and ion conductive polymer. Herein, it can be seen that uniformity of the coating layer may be secured by secondarily coating the conductive polymer on the surface of the primarily coated inorganic material.

Example 3. Manufacture of Electrode and Cell Using the Coated Cathode Active Material After poly (vinylidene fluoride) (PVdF), used as a binder in order to manufacture a positive electrode; was completely dissolved in N-methylpyrrolidone, super-P carbon, as a conductive material; and double-coated LiNi$_{0.6}$Co$_{0.2}$Mn$_{0.2}$O$_2$ were measured and put into the resulting mixture solution, and the resulting mixture was stirred. In this case, a weight ratio of the cathode active material, the conductive material, and the binder was set to 85:7.5:7.5.

The completely mixed slurry solution was applied on an aluminum foil, dried, and was subjected to a lamination process using a roll press. This was performed in order to enhance a mutual bonding force of the active material/the conductive material/the binder and effectively bind the materials to the current collector.

When the compression process was finished, an electrode having a suitable size was manufactured through a cutting process, and dried at 110° C. in a vacuum oven for 24 hours. A coin cell was manufactured using the manufactured positive electrode.

Lithium metal was laminated on a copper foil, and the resulting laminate was used as a negative electrode. A solution, prepared by dissolving 1 M LiPF$_6$ in a mixed solvent of ethylene carbonate/dimethyl carbonate (volume ratio 50/50), was used as an electrolytic solution, and a polyethylene separation film was used as a separation film. The preparation of all the electrodes was performed in a dry room, and the manufacture of a battery was performed in a glove box in which an argon atmosphere was maintained.

For the manufactured cell, charging and discharging cycles were performed in a range of 2.6 to 4.3 V or 2.6 to 4.6 V with a current density of 0.5 C.

Example 4. Evaluation of Characteristics of Lithium Secondary Battery

Figure 5A:
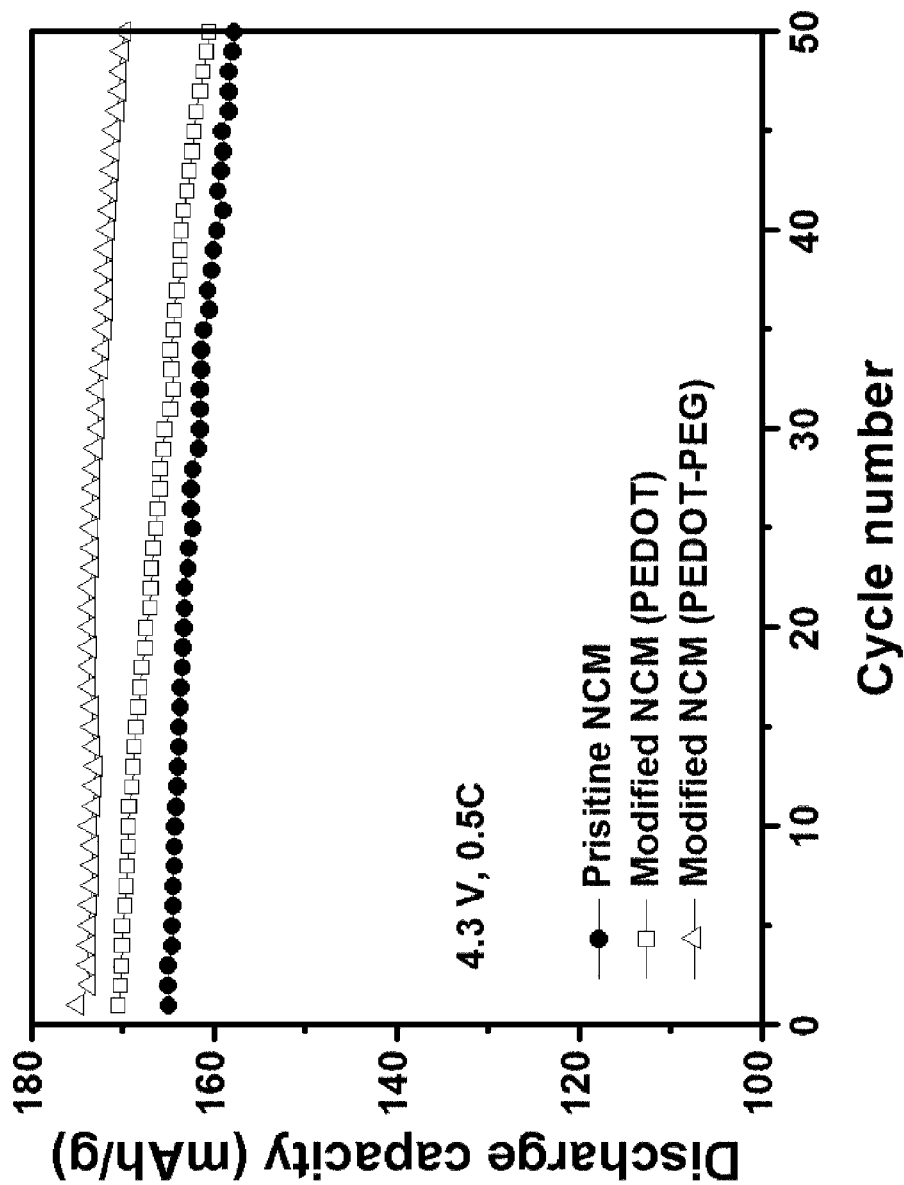
FIGS. 5A and 5B are graphs comparing cycle characteristics of an $LiNi_{0.6}Co_{0.2}Mn_{0.2}O_2$ electrode according to a charging voltage for the cathode active material, in which polyethylenedioxythiophene (PEDOT) or polyethylenedioxythiophene polyethylene glycol (PEDOT-PEG) are applied as coating materials and compared with each other.
Figure 5B:
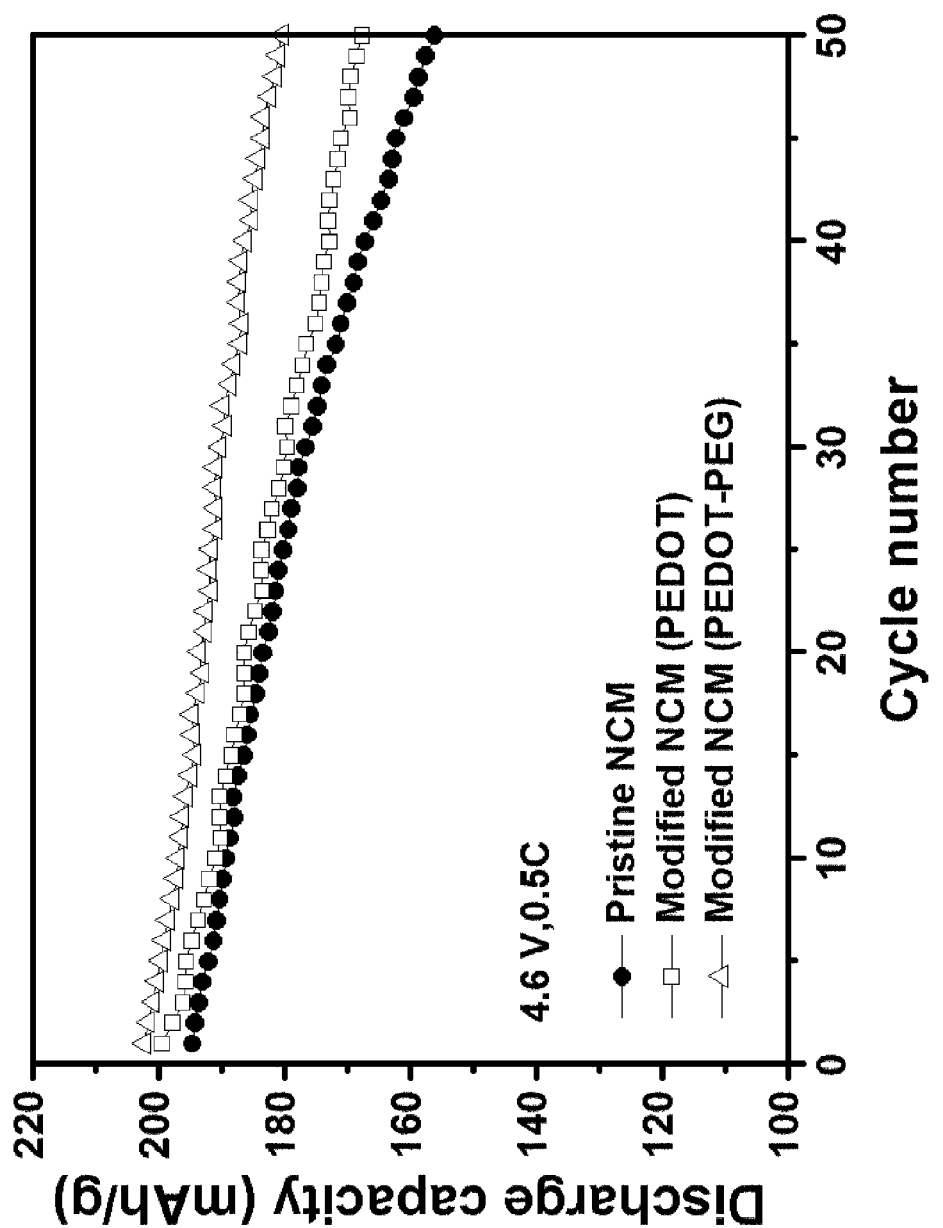

Service life characteristics of cells subjected to a formation process were evaluated for each charging voltage (4.3 V and 4.6 V) using each of a positive electrode (pristine) which was not coated, a positive electrode (modified NCM PEDOT) coated with only an electron conductive polymer, and a positive electrode (modified NCM PEDOT-PEG) coated with a polymer having both ion conductivity and electron conductivity. Charging and discharging results as illustrated in FIGS. 5A and 5B were obtained by repeating the charging and discharging 50 times with a current density of 0.5 C at room temperature. As a result, it can be seen that in the case of coating with the PEDOT-PEG, which is an ion conductive and electron conductive copolymerized polymer, the highest capacity and excellent service life characteristics are obtained.

Figure 6:
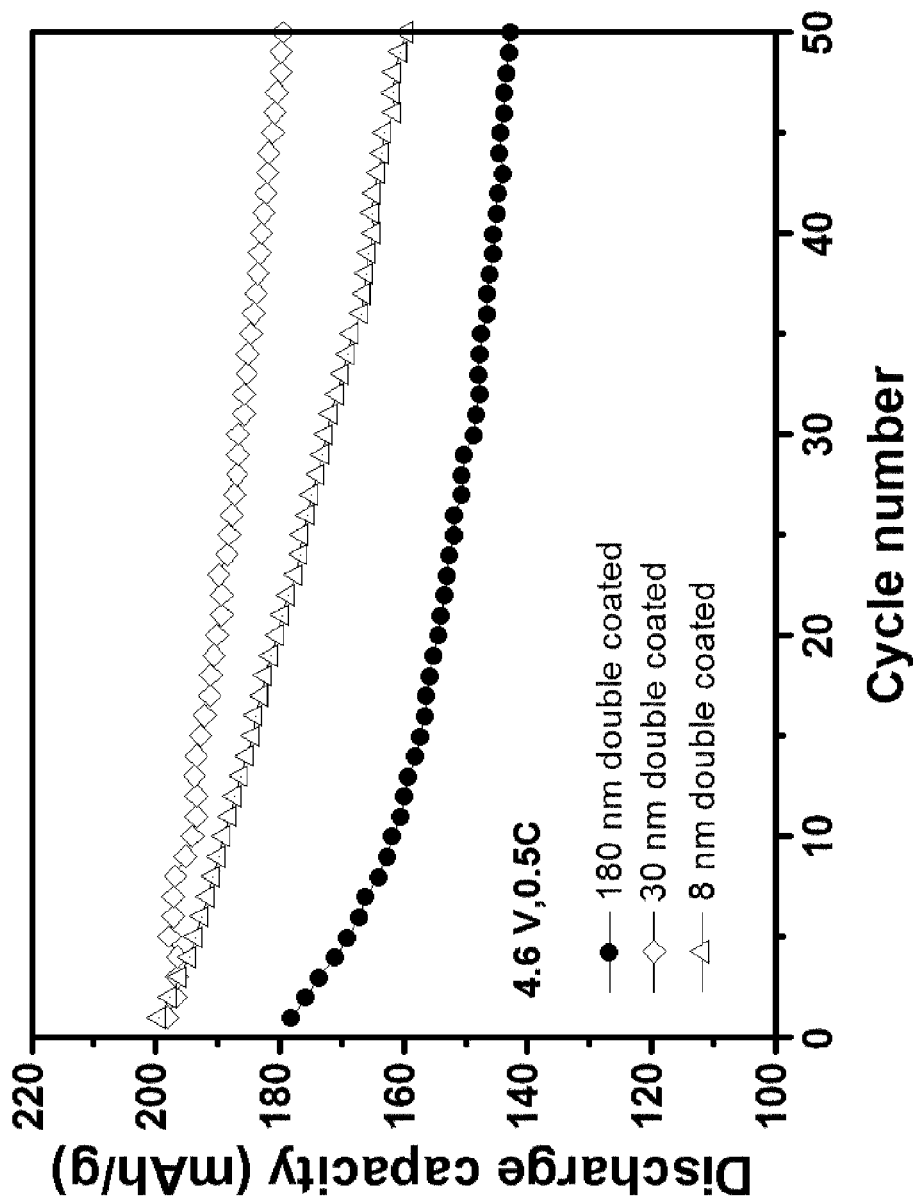
FIG. 6 is a graph comparing cycle characteristics for each thickness of a double coating by double coating the cathode active material, where charging and discharging are performed 50 times at a charging voltage of 4.6 V.

The cathode active material was double coated with primarily aluminum oxide and secondarily a PEDOT-PEG copolymer having electron conductivity and ion conductivity, and cycle characteristics for each coating thickness were evaluated and illustrated in FIG. 6. As a result, when the coating thickness was as thin as 8 nm, it can be seen that the initial capacity was high, but the service life characteristics rapidly deteriorated. When the coating thickness was as thick as 180 nm, the coating layer served as a resistor, so that a low discharging capacity value was obtained in the initial stage. In contrast, a positive electrode material double coated within a thickness of 30 nm showed excellent service life characteristics along with a high discharging capacity in an initial stage.

The service life characteristics were evaluated for each charging voltage (4.3 V and 4.6 V) in a case where the cathode active material was coated with only aluminum oxide and a case where the cathode active material was double coated with the aluminum oxide and the polymer having electron conductivity and ion conductivity. Results, as illustrated in FIGS. 7A and 7B, were obtained by repeating the charging and discharging 50 times with a current density of 0.5 C at room temperature.

Figure 7A:
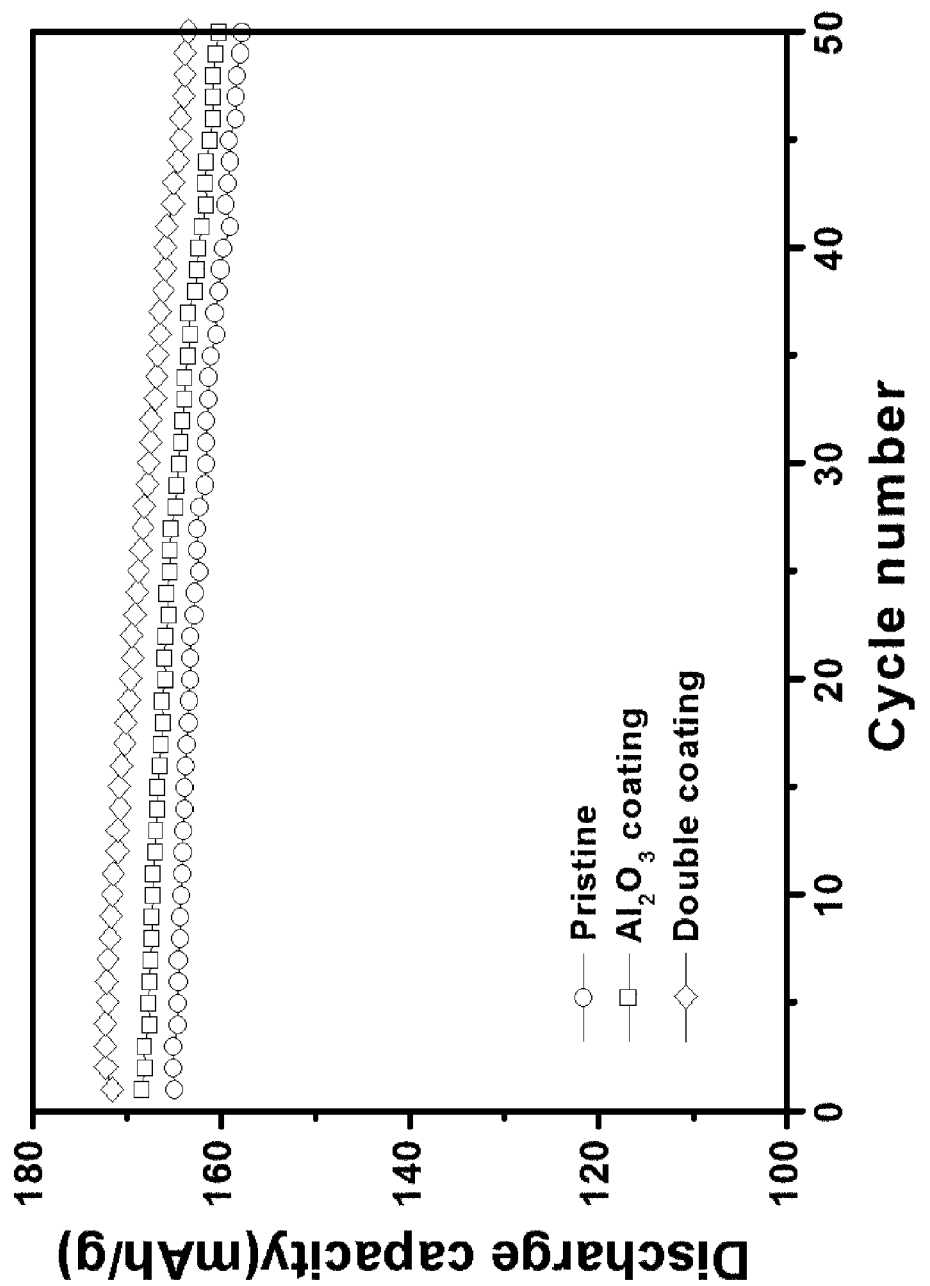
FIGS. 7A and 7B are graphs comparing cycle characteristics of the $LiNi_{0.6}Co_{0.2}Mn_{0.2}O_2$ electrode according to the charging voltage for the cathode active material, in which $Al_2O_3$ or $Al_2O_3$+PEDOT-PEG double coating are applied as coating materials and are compared with each other.
Figure 7B:
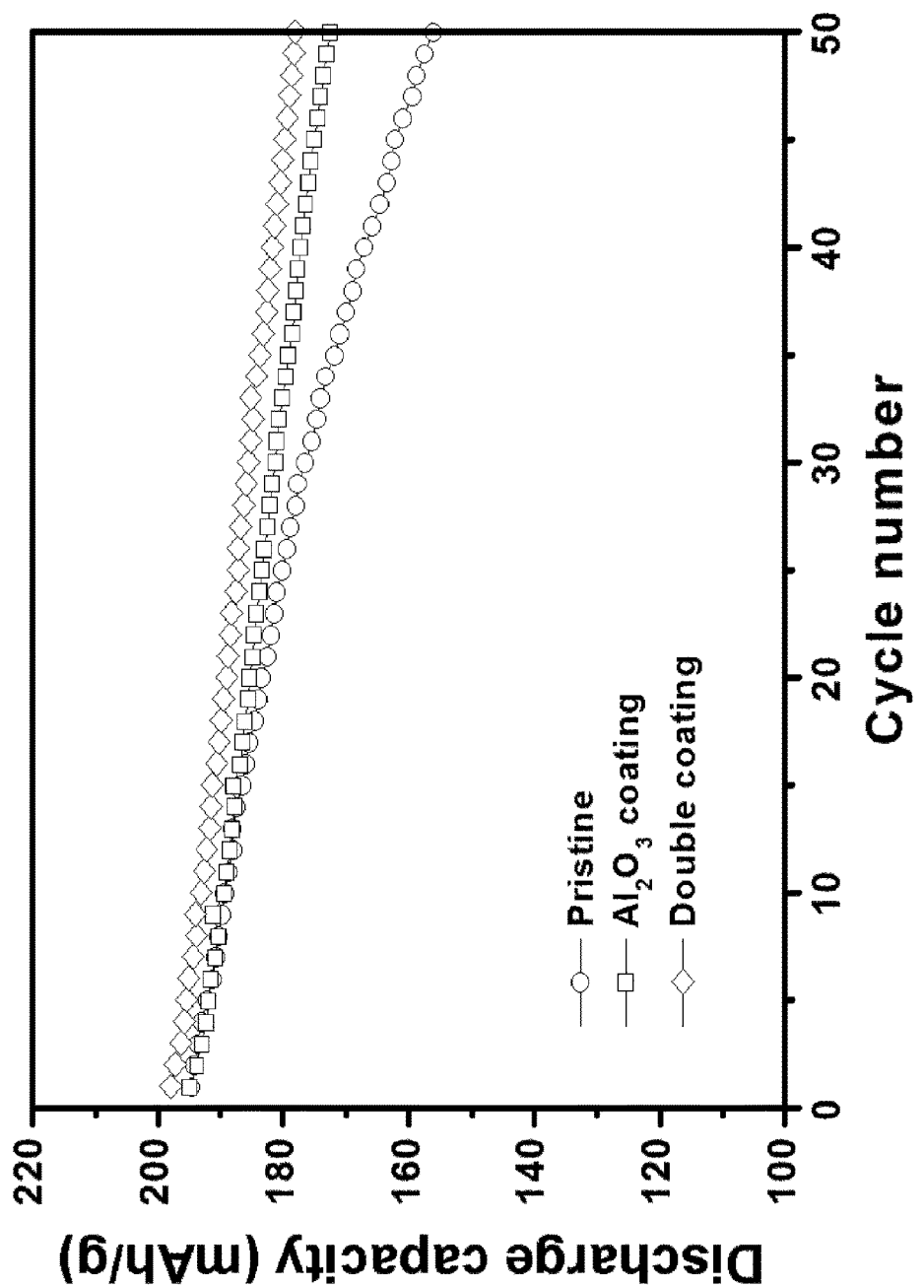

Referring to FIGS. 7A and 7B, the two cathode active materials coated with the aluminum oxide showed enhanced service life characteristics at both (FIG. 7A) 4.3 V and (FIG. 7B) 4.6 V, compared to the cathode active material which was not coated. However, a side reaction with a partial electrolytic solution was caused by non-uniformity of the coating. Therefore, the double coating compensated for the coating with the inorganic oxide material layer still has some drawbacks. The problem of the coating layer was overcome by introducing an electron and ion conductive copolymerized polymer. The double coated cathode active material showed the best performance and service life characteristics, and it was confirmed that the double coated cathode active material showed an excellent performance even when charging voltages were different.

Figure 8:
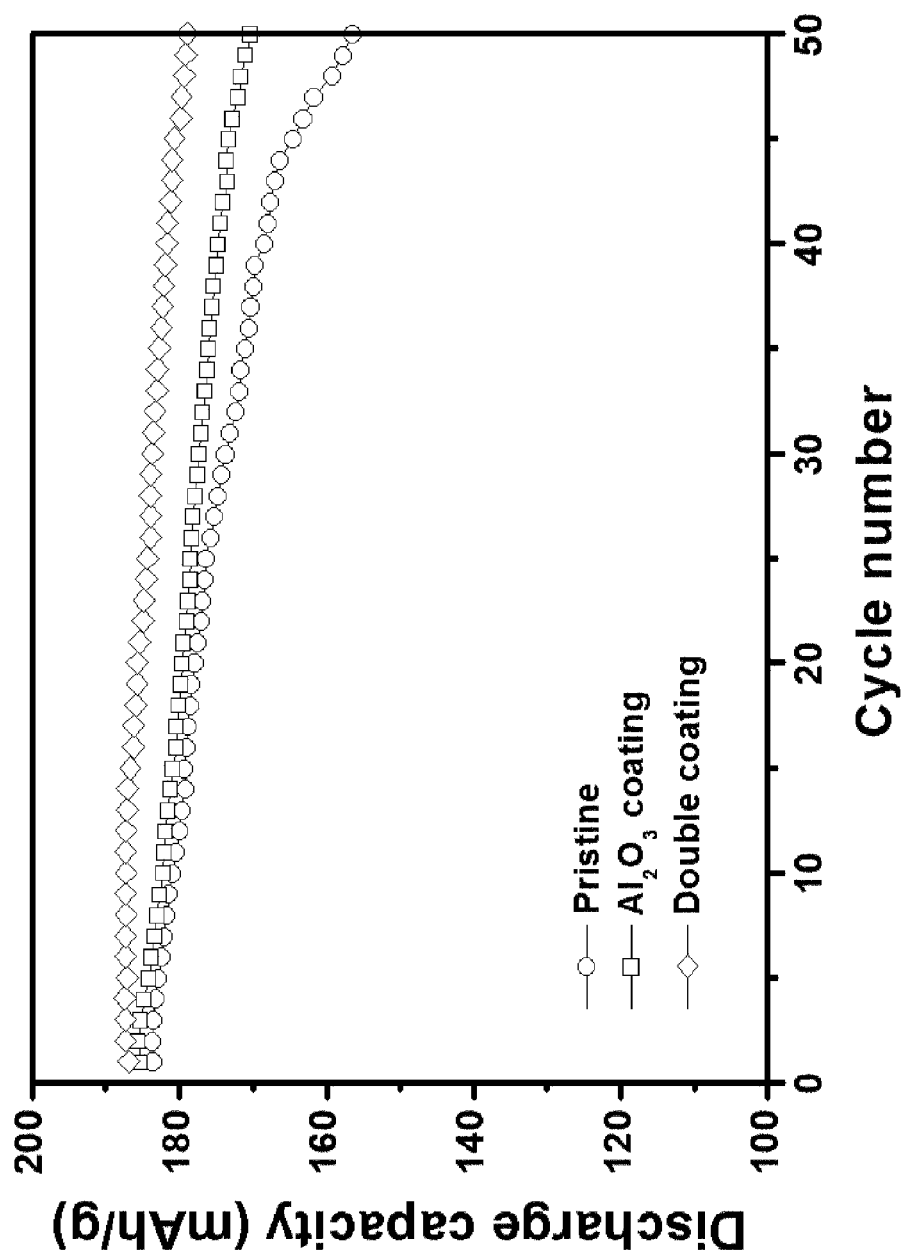
FIG. 8 is a graph comparing enhancements in cycle characteristics of the $LiNi_{0.6}Co_{0.2}Mn_{0.2}O_2$ electrode at a high temperature (55° C.) according to the coating of the cathode active material.

Service life characteristics were compared in a high temperature condition of 55° C., and results are illustrated in FIG. 8. Referring to FIG. 8, since cell internal resistance is decreased at high temperature, it can be seen that a higher capacity is implemented at high temperature than that at room temperature (see FIG. 7A). In contrast, it can be seen that the positive electrode material which is not coated has relatively poor service life characteristics while structural collapse of the cathode active material and the side reaction with the electrolytic solution also further rapidly occur. However, it can be seen that an electrode double coated with aluminum oxide and a conductive polymer shows high capacity and excellent service life characteristics. This is because the double coated metal oxide and polymer coating layer effectively suppresses the side reaction with the electrolytic solution.

Example 5. Evaluation of High Rate Characteristics

The charging and discharging evaluation was performed three times according to each current density while increasing the current density from low rate to high rate. This is a test in which capacity characteristics of the cathode active material are confirmed under conditions where the rapid charging and discharging is performed and a technique which evaluates characteristics by successively applying high current, unlike the evaluation of service life characteristics, in which a constant current density is applied.

Figure 9:
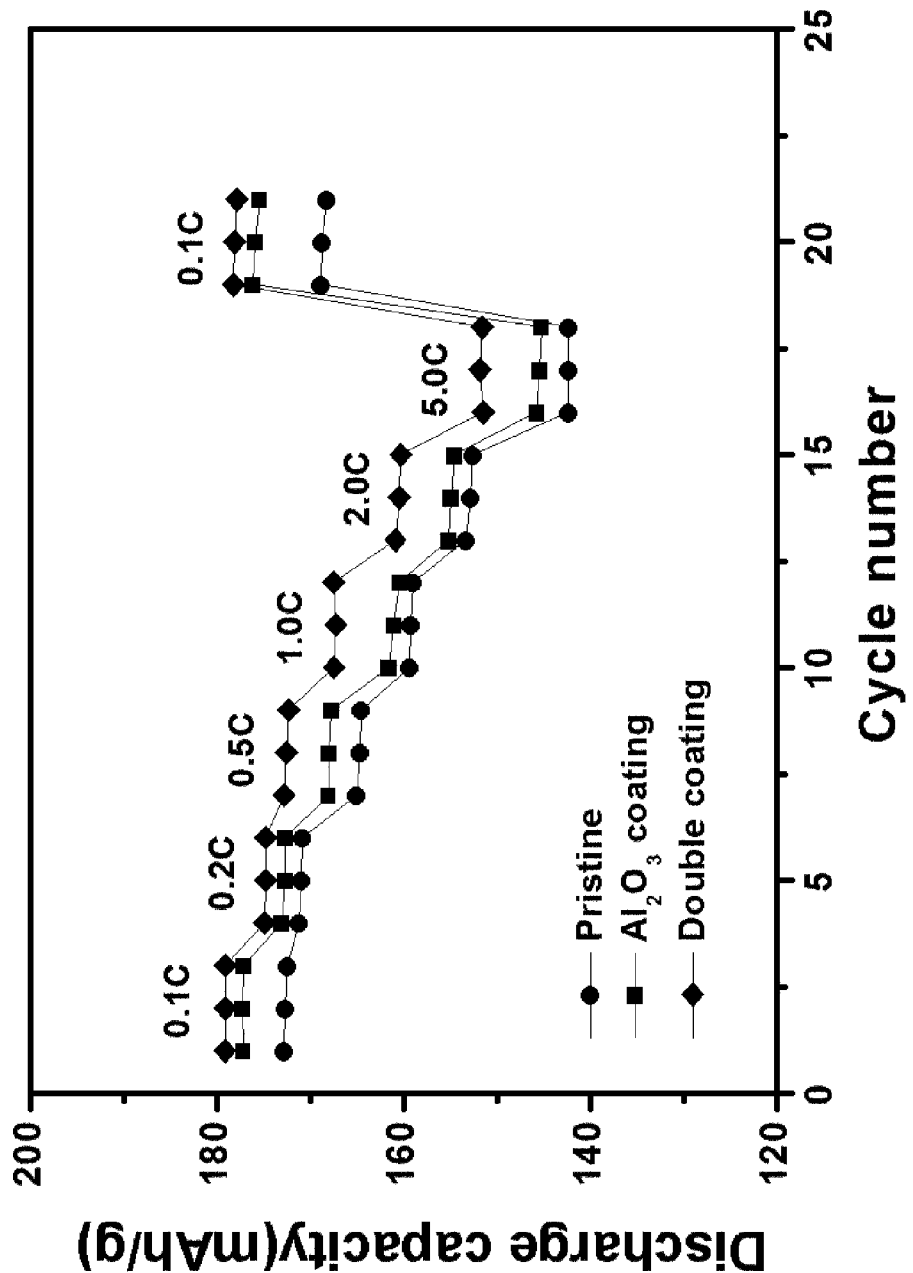
FIG. 9 is a graph comparing discharging capacities of the $LiNi_{0.6}Co_{0.2}Mn_{0.2}O_2$ electrode according to a discharging rate (C rate) of the cathode active material.

Results of evaluating the charging capacity are illustrated in FIG. 9. The results in FIG. 9 show that the double coated electrode exhibits high capacity at a high rate which requires a high output. In particular, a capacity recovery rate of the cathode active material is confirmed by changing the current density from a low rate to the high rate, and the structural stability may be indirectly confirmed. For the double coated electrode as illustrated in FIG. 6, a high capacity recovery rate of 99.8% was obtained.

Figure 10:
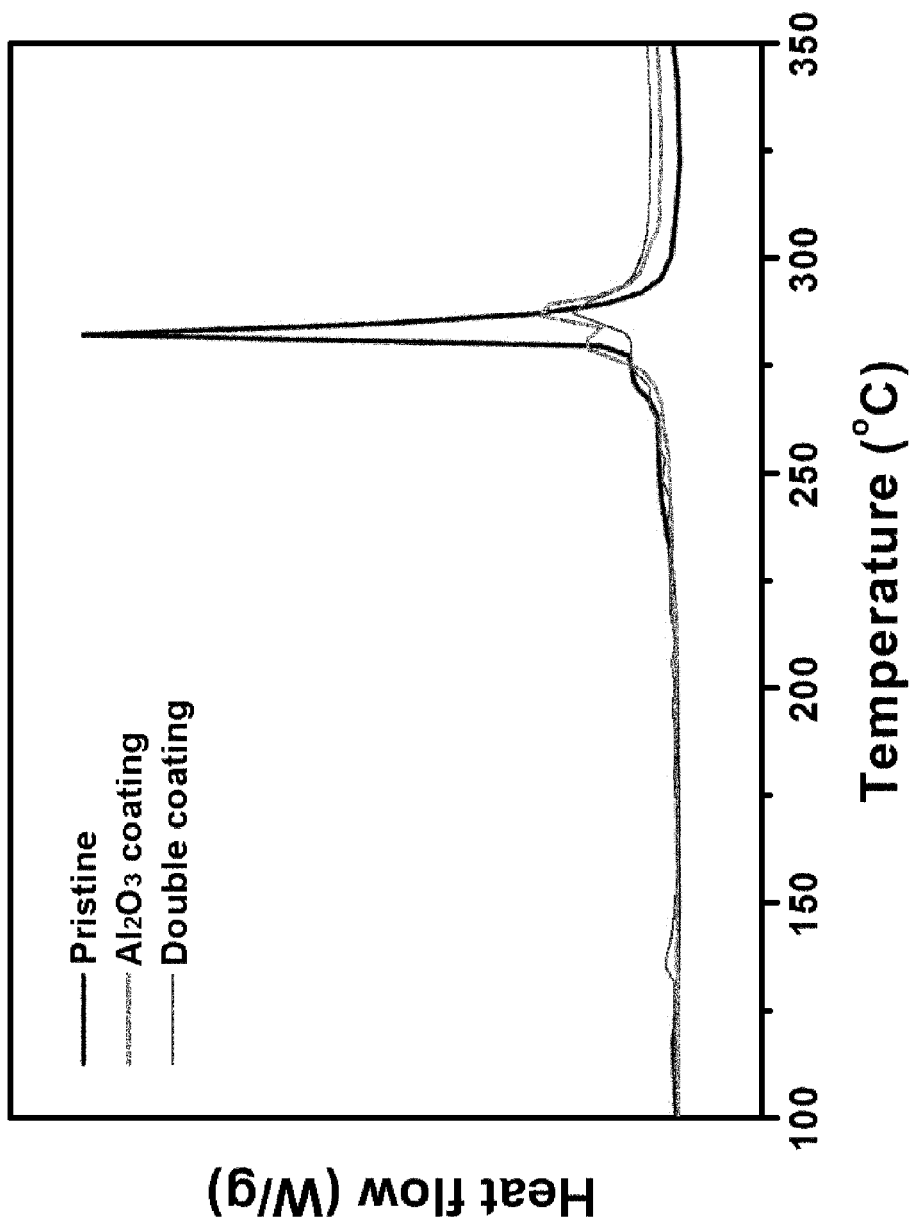
FIG. 10 is a graph comparing enhancements in thermal stability of the $LiNi_{0.6}Co_{0.2}Mn_{0.2}O_2$ electrode according to the coating of the cathode active material.

Example 6. Evaluation of Thermal Stability after Evaluation of Service Life Characteristics After the service life characteristics of the lithium secondary battery were evaluated, the battery was dissembled in a charging state, thermal stability of the cathode active material was analyzed by a differential scanning calorimeter (DSC) and illustrated in FIG. 10, and results are summarized in the following Table 1.

In a case of the coated electrode, it can be seen that an exothermic peak shifted to a high temperature region, and the amount of heat released was rapidly decreased. It can be seen that the coating layer composed of the metal oxide and the polymer suppresses an exothermic reaction of the cathode active material with the electrolytic solution, so that thermal stability was enhanced.

The following Table 1 compares DSC thermal characteristics of the cathode active material in a charging state after charging and discharging.

TABLE 1

| Electrode | Exothermic peak temperature (° C.) | Amount of heat released (J/g) |
| --- | --- | --- |
| Pristine positive electrode | 281.0 | 587.5 |
| Aluminum oxide coated positive electrode | 286.9 | 320.1 |
| Double coated positive electrode | 287.4 | 198.5 |

Example 7. Evaluation of Performance of Lithium Secondary Battery

Figure 11A:
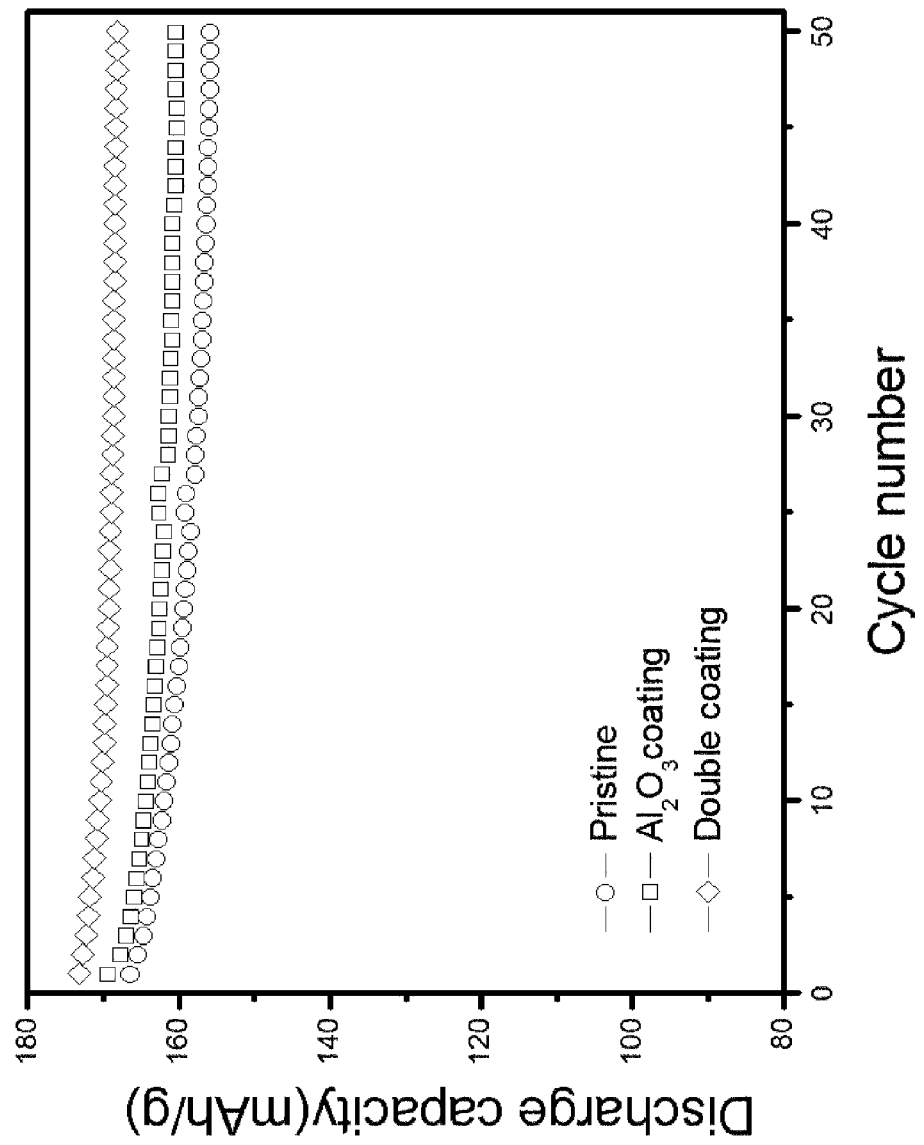
FIGS. 11A and 11B are graphs comparing cycle characteristics of a lithium secondary battery according to a charging voltage for the lithium secondary battery to which the cathode active material is applied.
Figure 11B:
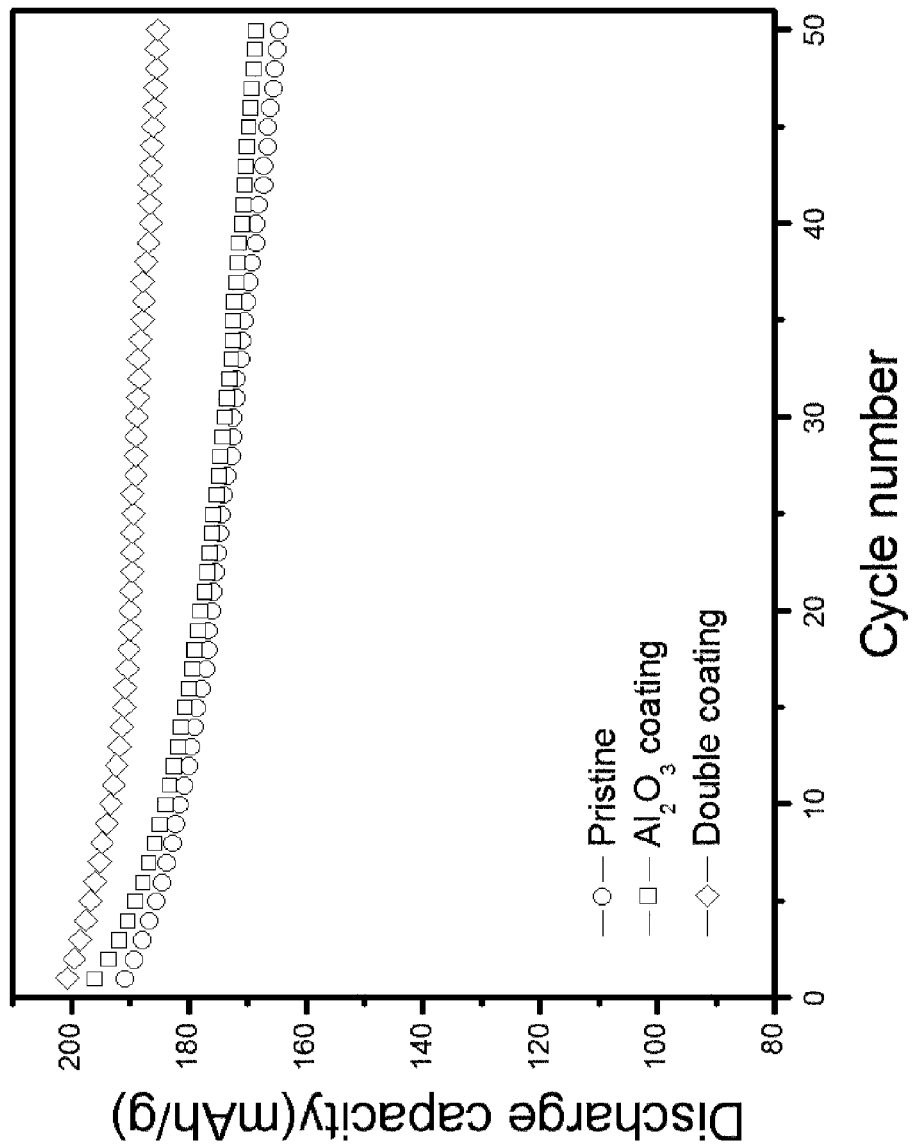

A lithium secondary battery was manufactured by using a graphite-based mesocarbon microbeads (MCMB) as a negative electrode, and characteristics for each condition were evaluated. After the lithium secondary battery was manufactured, service life characteristics of cells formed in accordance with the present disclosure were evaluated for each charging voltage (4.3 V and 4.6 V). Charging and discharging results as illustrated in FIGS. 11A and 11B were obtained by repeating charging and discharging 50 times with a current density of 0.5 C at room temperature. When the charging voltage was 4.3 V, the positive electrode double coated with aluminum oxide and a PEDOT-PEG polymer having electron conductivity and ion conductivity showed the highest initial capacity and excellent service life characteristics as illustrated in FIG. 11A. FIG. 11B illustrates service life characteristic results for the charging of high voltage (4.6 V). It can be seen that as the charging voltage is increased, the service life characteristics are significantly enhanced through a double coating of aluminum oxide and PEDOT-PEG.

Figure 12:
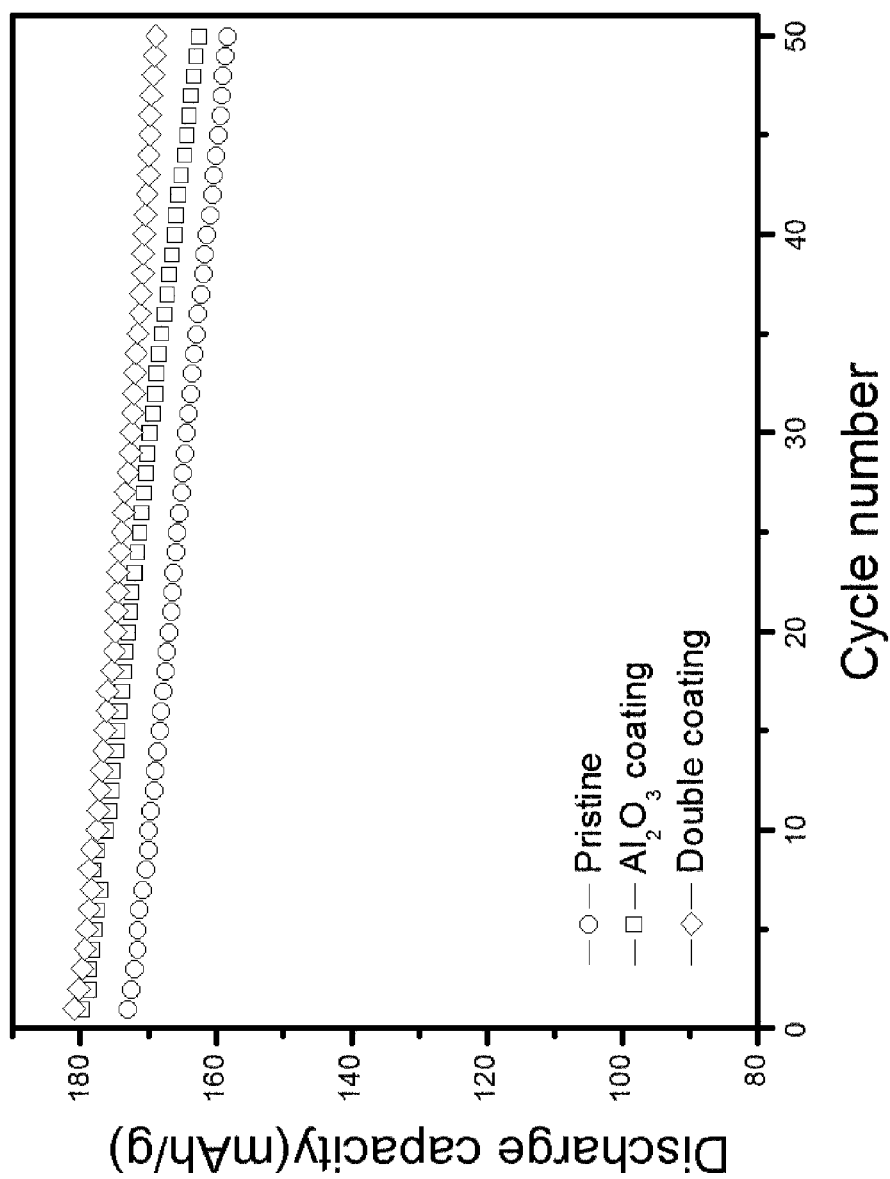
FIG. 12 is a graph comparing cycle characteristics of a lithium secondary battery at a high temperature (55° C.) for the lithium secondary battery in which the cathode active material is used.

For a lithium secondary battery, in which the double coated cathode active material was used, cycle characteristics were evaluated at high temperature and illustrated in FIG. 12. In the graph of FIG. 12, coated active materials show better service life characteristics at a high temperature (55° C.) than a case in which uncoated cathode active material is used. In particular, due to suppressing destruction effects of the crystal structure of the cathode active material along with a decomposition of the electrolytic solution, double coating with the aluminum oxide and the PEDOT-PEG polymer show enhanced service life characteristics compared to the existing cathode active material.

The surface-treated cathode active material according to the present disclosure may be applied to small and medium to large lithium secondary batteries. In particular, the surface-treated cathode active material according to the present disclosure may be applied to lithium secondary batteries used in various mobile electronics, electric vehicles, and energy storing systems.

The invention has been described in detail with reference to the embodiments thereof. However, it will be appreciated by those skilled in the art that changes may be made in these embodiments without departing from the principles and spirit of the invention, the scope of which is defined in the appended claims and their equivalents.

What is claimed is:

1. A surface-treated cathode active material which is double-coated by primarily coating a metal oxide on a surface of a cathode active material, and secondarily coating a polymerized copolymer having both electron conductivity and ion conductivity thereby forming a double coating on the surface of the cathode active material,
wherein the polymerized copolymer is separated from the surface of the cathode active material and is a poly(3,4-ethylenedioxythiophene)-block-poly(ethylene glycol) (PEDOT-PEG).

2. The surface-treated cathode active material of claim 1, wherein the cathode active material is selected from lithium transition metal oxides and sulfur compounds.

3. The surface-treated cathode active material of claim 1, wherein the metal oxide is one or more selected from the group consisting of $Al_2O_3$, $SiO_2$, $TiO_2$, $SnO_2$, $CeO_2$, $ZrO_2$, $BaTiO_3$, and $Y_2O_3$.

4. The surface-treated cathode active material of claim 1, wherein the metal oxide has an average particle diameter in a range of 1 to 100 nm.

5. The surface-treated cathode active material of claim 1, wherein a total thickness of the double coating is in a range of 10 to 100 nm.

6. A lithium secondary battery comprising the surface-treated cathode active material of claim 1.

7. The lithium secondary battery of claim 6, wherein the battery is for a mobile electronic battery and an electric vehicle battery.

8. A lithium secondary battery comprising the surface-treated cathode active material of claim 2.

9. A lithium secondary battery comprising the surface-treated cathode active material of claim 3.

10. A lithium secondary battery comprising the surface-treated cathode active material of claim 4.

11. A lithium secondary battery comprising the surface-treated cathode active material of claim 5.

* * * * *

UNITED STATES PATENT AND TRADEMARK OFFICE
CERTIFICATE OF CORRECTION

PATENT NO.        : 10,347,918 B2
APPLICATION NO.   : 14/536207
DATED             : July 9, 2019
INVENTOR(S)       : Kyo Min Shin et al.

Page 1 of 1

It is certified that error appears in the above-identified patent and that said Letters Patent is hereby corrected as shown below:

On the Title Page

Please insert Item (30) at Column 1, after Item (22):
-- (30) Foreign Application Priority Data:
December 30, 2013 (KR) ............ 10-2013-0167772 --

Signed and Sealed this
Second Day of June, 2020

Andrei Iancu
*Director of the United States Patent and Trademark Office*